3,075,927
FLAME-RESISTANT URETHANE FOAMS AND PROCESS FOR PREPARING SAME
William M. Lanham, Charleston, W. Va., assignor to Union Carbide Corporation, a corporation of New York
No Drawing. Filed June 9, 1960, Ser. No. 34,872
9 Claims. (Cl. 260—2.5)

This invention relates to flame-resistant polyurethane foams, and particularly to such compositions which are self-extinguishing and possess a high degree of flame resistance.

Synthetic urethane foams derived from reactions involving isocyanates with active hydrogen-containing polyethers are finding widespread utility in the field of insulation, structural reinforcement, cushioning, electrical encapsulation and in domestic electrical equipment such as refrigerators, freezers and the like. One formidable factor limiting the commercial utilization and growth potential of the foamed urethane products is their risk of flammability in applications where high temperatures and/or exposure to fire may be encountered.

Although various organic and inorganic compounds have been recommended for the flameproofing of fibers, textiles, wood and plastics, including, for example, boron, phosphorus and chlorine-containing compounds, the oxides of zinc, bismuth, antimony and arsenic, as well as mixtures thereof, the incorporation of such compounds in low density urethane foams having large surface areas frequently results in a loss of desired physical properties, e.g., tensile strength, compression set, elongation and load bearing properties, which limit the utility of the foam for its intended purpose. For example, the incorporation of a hygroscopic flameproofing additive in a urethane foam may reduce flammability tendencies but at the same time effect increase moisture absorption, thus resulting in poor aging characteristics. Similarly the use of flameproofing additives may upset the surface chemistry of the foaming system and lead to severe destruction of internal cell structures, formation of a coarse cell structure and/or collapse of the foam. The difficulty in successful flameproofing urethane foams as opposed to bulk materials is further complicated by the troublesome problems of proper additive distribution at gas-solid interfacial surfaces due to the inherent physical movement of the composition during the foaming operation. As can be appreciated, the efficient flameproofing of a urethane foam is not merely a simple function of incorporating various flameproofing agents.

The discovery has now been made that flame-resistant polyurethane foams possessing desirable physical properties can be readily prepared from polyether derivatives of benzene compounds which have incorporated therein a limited proportion of flameproofing additives consisting of a vinyl halide resin and antimony trioxide. It has been found that the amount of flameproofing additives and the polyether structure are highly significant factors in preparing flame-resistant polyurethane foams without incurring deleterious effects or an appreciable loss of desired physical properties. Urethane foams prepared from polyether derivatives of benzene compounds can be rendered flame-resistant at lower additive levels than comparable urethane formulations derived, for example, from aliphatic-based polyethers. The achievement of flame resistance at a low additive level thus means that in a broad spectrum of polyether-based urethane foams classified as either self-extinguishing or non-burning by the ASTM D-1692 flammability test, the flame-resistant urethane compositions of the invention possess better mechanical and physical properties of dimensional stability, cell structure and product strength. By means of the present invention flame-resistant polyurethane foams of widely varying and preselected properties are readily prepared which broadens considerably their realm of practical utility.

The term "flame-resistant" as employed herein is used to characterize a material which does not burn readily. The terms "burning," "self-extinguishing" and "non-burning" are defined in accordance with the "Tentative Method of Test for Flammability of Plastic Foams and Sheeting," ASTM D-1692–59T. In this test the flame of a Bunsen burner, having a blue cone of about 1½ inches in height, is applied separately to the front edge of ten foam specimens, 6"x2"x½", and allowed to remain in contact therewith for a period of sixty seconds. The extent of burning is considered the furthermost point reached by the flame front whereas the burning rate in inches per minute is a measure of the time necessary for the flame front to consume five inches of the foam specimen. A sample is judged "non-burning" if no evidence of ignition, such as flame or progressive glow, is seen in each specimen after removal of the flame. If the flame front of two or more specimens reaches the five inch mark the sample is judged "burning." A sample is judged "self-extinguishing" when ignition of the ten specimens gives an extent of burning less than five inches.

In accordance with the invention polyurethane foams which are self-extinguishing and possess a high degree of flame resistance are prepared by mixing together a polyisocyanate and polyether derivative of a benzene compound having active hydrogens with about 0.5 to 5.0% by weight antimony trioxide and about 1.0 to 10% by weight of a vinyl halide resin, building up the urethane polymer network and thereafter developing the foam reaction. The vinyl halide resin and antimony oxide flameproofing ingredients can be added to the liquid polyether, the isocyanate or the polyether-isocyanate reaction mixture. The mixture is then foamed in the presence of a catalyst by means of a blowing agent or internal development of carbon dioxide. The network formation and building up of the foam can take place substantially simultaneously, as in the one-shot method, or in more or less distinct steps as in the prepolymer and semiprepolymer techniques, more fully described hereinafter.

The maximum weight percentages of antimony trioxide and vinyl halide resin based on the weight of the polyether-isocyanate reaction mixture are of considerable technical importance in obtaining urethane foams of optimum flame resistance which suffer no major effects on desired properties. For example, with antimony trioxide alone desirable effects on physical properties of dimensional stability and cell structure are obtained with low concentrations ranging from 0.5 to 5% by weight and preferably about 2%. However, in order to render the foam self-extinguishing and non-dripping higher concentrations on the order of 10 to 15% by weight antimony trioxide are needed. The increased concentration of oxide is accompanied by correspondingly more severe undesirable effects on mechanical properties of tensile, shear and compression strengths. In order to obtain improved physical properties resulting from low antimony oxide concentrations as well as optimum flameproofing without encountering undesirable effects produced by high antimony oxide concentrations, the vinyl halide resins are used in amounts ranging from 1 to 10% by weight. Higher concentrations, i.e., greater than 10% vinyl halide resin, result in significantly reduced tensile and compressive strengths. Based on the polyether - isocyanate reaction mixture the preferred amount of vinyl halide resin and antimony oxide used for purposes of the invention ranges from 2 to 4% and 3 to 7% by weight, respectively, of antimony trioxide and vinyl halide resin.

The vinyl halide resins used for purposes of the invention are characterized as having a reduced viscosity of 0.1 and lower to about 10.0 and higher in the best solvent available for a particular resin. The preferred range in this invention is 0.1 to 4.0. Reduced viscosity may be determined with the Ubbelohde, Ostwald or equivalent viscometer in the temperature range between 20° C. and 30° C. using a resin concentration in solution sufficiently low to produce an approximate linear relationship between reduced viscosity and polymer concentration between infinite dilution and the concentration at which the reduced viscosity is determined. Reduced viscosity is defined as:

$$I_r = \frac{T - T_0}{(T_0)(C)}$$

in which T is the time required for a low concentrate resin solution to pass through a standardized Ubbelohde viscometer; $T_0$ is the time for the pure solvent to pass through the viscometer; and C is the concentration of the solution.

Representative vinyl halide resins include homopolymers such as poly(vinyl chloride) and poly(vinylidene chloride) as well as copolymers of vinyl chloride with a vinyl ester of a lower alkanoic acid or other polymerizable olefinically unsaturated compound such as, for example, vinyl acetate, vinyl propionate, vinyl hexoate, methyl acrylate, butyl acrylate, methyl methacrylate, butyl methacrylate, methyl chloroacrylate, acrylonitrile, vinylidene chloride, dibutyl maleate, and the like. Also included are copolymers of a vinyl halide and vinyl ester of a lower alkanoic acid, e.g., vinyl chloride and vinyl acetate, which have been partially hydrolyzed and contain reactive hydroxyl groups. The hydroxyl-containing resins advantageously provide a means whereby the halide can be chemically combined in the urethane molecule by reaction with isocyanate group (—NCO) to become an integral part of the final form. Carboxylic acid-containing resins, such as a copolymer of vinyl chloride and monobutyl maleate, are also useful in this invention since the carboxylic acid group can be chemically combined in the urethane molecule.

The preferred vinyl halide resins are poly(vinyl chloride) and copolymers of vinyl chloride with vinyl acetate which contain from about 25 to 99% by weight vinyl chloride.

The vinyl halide resins above described also can be used in the form of a plastisol, the term "plastisol" referring to fluid suspensions of finely divided vinyl halide resins in liquid plasticizers. The plastisol technique offers a distinct advantage in urethane applications by providing a fluid dispersion at room temperature which can be easily pumped or used in spray techniques.

Representative liquid plasticizers which can be employed include non-polymerizable ester plasticizers such as the alkyl and aryl phosphates, the alkyl phthalates, adipates, sebacates, azelates and epoxidized vegetable oil. Among these can be mentioned tri-(2-ethylhexyl) phosphate, tricresyl phosphate, di-(2-ethylhexyl) phthalate, and di-(2-ethylhexyl) adipate, etc. Other suitable plasticizers include triethylene glycol di-(2-ethylhexoate), polyethylene glycol di-(2-ethylhexoate), 2,2'-(2-ethylhexamido)-diethyl-di-(2-ethylhexoate), tetrabutyl thiodisuccinate and the commercial plasticizers sold under the trademark "Santicizer" which include:

Santicizer 8=A mixture of ortho and para toluene ethyl sulfonamides
Santicizer 9=A mixture of ortho and para toluene sulfonamides
Santicizer 130=N-isopropyl benzene sulfonamide
Santicizer 131=Mixed N-isopropyl benzene sulfonamide and N-isopropyl toluene sulfonamide
Santicizer 3=N-ethyl-p-toluene sulfonamide
Santicizer IH=Cyclohexyl-p-toluene sulfonamide The preferred plasticizers are the non-combustible plasticizers such as tricresyl phosphate, tri-(2-ethylhexyl) phosphate, tri-(2-chloroethyl) phosphate, and tri-(dichloropropyl) phosphate. These plasticizers as well as others mentioned above can be employed in resin to plasticizer weight ratios in the range of about 5:1 to 1:2 and preferably 4:1 to 1:1.

The polyethers used in preparing the flame-resistant polyurethane foams include a wide variety of polyether derivatives of benzene compounds. The designated polyethers contain at least one benzene nucleus and are further characterized as having a molecular weight of at least about 200, a plurality of ether oxygens and at least two active hydrogens as measured and determined by the Zerewitinoff method, J.A.C.S., vol. 49, p. 3181 (1927). Since the preparation of flame-resistant polyurethane foams according to the invention is dependent upon the use of polyethers which contain a benzene nucleus, the useful polyethers can be derived from polyhydroxybenzene such as catechol or from complex polymeric materials such as the novolaks and resoles. The selection of a particular polyether compound is governed by the properties desired in the final urethane composition and by practical considerations such as cost and commercial availability.

Illustrative polyethers include those prepared by reacting a 1,2-alkylene oxide such as ethylene oxide, propylene oxide, butylene oxide or mixtures thereof with mononuclear polyhydroxybenzenes such as resorcinol, pyrogallol, phloroglucinol, hydroquinone, 4,6-di-t-butylcatechol, catechol, orcinol, methylphoroglucinol, 2,5,6-trimethylresorcinol, 4-ethyl-5,6-dimethylresorcinol, n-hexylresorcinol, 4-chloro-5-methylresorcinol, and the like; polyethers prepared by reacting 1,2-alkylene oxides or mixtures thereof with fused ring systems such as 3-hydroxy-2-naphthol, 6,7-dihydroxy-1-naphthol, 2-hydroxy-1-naphthol, 2,5-dihydroxy-1-naphthol, 9,10-dihydroxyanthacene, 2,3-dihydroxyphenanthrene, etc.

Other polyethers which can be employed are those obtained by reacting 1,2-alkylene oxides or mixtures thereof with polynuclear hydroxybenzenes such as the various di-, tri- and tetra-phenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound.

Exemplary diphenylol compounds include 2,2-bis(p-hydroxyphenyl)propane; bis(p - hydroxyphenyl)methane and the various diphenols and diphenylol methanes disclosed in U.S. Patents 2,506,486 and 2,744,882, respectively.

Exemplary triphenylol compounds which can be employed include the alpha, alpha, omega, tris(hydroxyphenyl)alkanes such as 1,1,2-tris(hydroxyphenyl)ethanes; 1,1,3-tris(hydroxyphenyl)propanes; 1,1,3-tris(hydroxy-3-methylphenyl)propanes; 1,1,3-tris(dihydroxy-3 - methylphenyl)propanes; 1,1,3-tris(hydroxy-2,4-dimethylphenyl)-propane; 1,1,3-tris(hydroxy-2,5-dimethylphenyl)propanes; 1,1,3-tris(hydroxy - 2,6 - dimethylphenyl)propane; 1,1,4-tris(hydroxyphenyl)butanes; 1,1,4 - tris(hydroxyphenyl)-2-ethylbutanes; 1,1,4-tris(dihydroxyphenyl)butanes; 1,1,5-tris(hydroxyphenyl)-3 - methylpentanes; 1,1,8 - tris(hydroxyphenyl)octanes; 1,1,10-tris(hydroxyphenyl)decanes, and the like.

Tetraphenylol compounds which can be reacted with 1,2-alkylene oxides include the alpha, alpha, omega, omega, tetrakis(hydroxyphenyl)alkanes such as 1,1,2,2-tetrakis(hydroxyphenyl)ethanes; 1,1,3,3-tetrakis(hydroxy-3-methylphenyl)propanes; 1,1,3,3-tetrakis(dihydroxy - 3-methylphenyl)propanes; 1,1,4,4-tetrakis(hydroxyphenyl)- butanes; 1,1,4,4-tetrakis(hydroxyphenyl)-2-ethylbutanes; 1,1,5,5-tetrakis(hydroxyphenyl)pentanes; 1,1,5,5-tetrakis-(hydroxyphenyl)-3-methylpentanes; 1,1,5,5-tetrakis(dihydroxyphenyl)pentanes; 1,1,8,8-tetrakis(hydroxy-3-butylphenyl)octanes; 1,1,8,8-tetrakis(dihydroxy-3 - butylphenyl)octanes; 1,1,8,8-tetrakis(hydroxy-2,5-dimethylphenyl)-octanes; 1,1,10,10-tetrakis(hydroxyphenyl)decanes; and the corresponding compounds which contain substituent groups in the hydrocarbon chain such as 1,1,6,6-tetrakis-(hydroxyphenyl)-2-hydroxyhexanes; 1,1,6,6-tetrakis(hydroxyphenyl)-2-hydroxy-5-methylhexanes; 1,1,7,7 - tetrakis(hydroxyphenyl)-3-hydroxyheptanes; and the like.

Other suitable polyethers include the 1,2-alkylene oxide derivatives of mononuclear primary amines such as o-, m-, and p-phenylenediamine; 2,4- and 2,6-diaminotoluene; 2,6-diamino-p-xylene; 4,6-diamino-m-xylene; 2,4-diamino-m-xylene; 3,5-diamino-o-xylene; isohexyl-p-phenylenediamine; 3,5-diaminotoluene; and the like; polynuclear and fused aromatic polyamines such as 1,4-naphthylenediamine; 1,5-naphthylenediamine; 1,8-naphthylenediamine; benzidine; tolidine; 4,4'-methylenedianiline; 3,3'-dimethoxy-4,4'-biphenyldiamine; 3,3'-dichloro-4,4' - biphenyldiamine; 3,3'-dimethyl-4,4'-biphenyldiamine; 4,4'-ethylenedianiline; 4,4'-ethylidenedianiline; 1-fluorenamine; 2,5-fluorenediamine; 2,7-fluorenediamine; 1,4-anthradiamine; 3,3'-biphenyldiamine; 3,4-biphenyldiamine; 9,10-diaminophenanthrene; and 4,4'-diaminoazobenzene, etc.

Higher functional mono- and polynuclear polyamines which also can be reacted with 1,2-alkylene oxides to provide useful polyether starting materials include 2,4,6-triaminotoluene; 2,3,5-triaminotoluene; 5,6-diaminoacenaphthene, 4,4',4" - methylidynetrianiline, 3,5 - diaminobenzoic acid, triaminodiphenyl ethers and sulfides such as 2,4,4'-triaminodiphenyl ether; 2,3',4-triamino-4'-methyldiphenyl ether; 2,3',4 - triamino - 4' - methoxydiphenyl ether; and polyamines obtained by interaction of aromatic monoamines with formaldehyde or other aldehydes, for example:

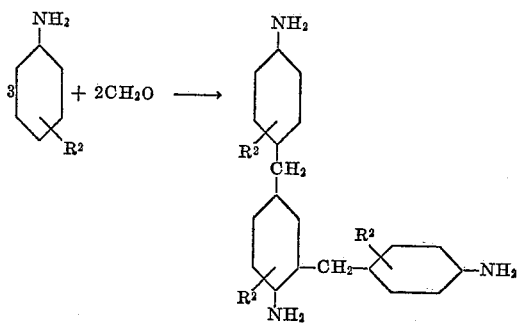

wherein R² is hydrogen or an alkyl group.

Other particularly useful polyethers which can be employed are the ethylene oxide, propylene oxide and butylene oxide adducts of phenolic and resole type resinous materials.

Novolaks are believed to be mixtures of polynuclear compounds of the diphenylmethane type of structure, such as 4,4'-dihydroxydiphenylmethane and 2,4'-dihydroxydiphenylmethane formed by the Baeyer reaction of phenol and formaldehyde. In a typical synthesis, novolaks are prepared by condensing one mole of phenolic compound, such as phenol or cresol, with 0.8 mole of an aldehyde, such as formaldehyde or furfural, under acid conditions at a temperature around 160° C. to 170° C. The polynuclear products frequently contain 4 to 8 units and may contain 12 or more units. Novolaks, as such, are non-curable, thermoplastic resins. Resoles, or Bakelite-type resins, are one-stage thermosetting resins produced by the condensation of phenols and aldehydes under alkaline conditions. It is believed that resoles differ from novolaks in that polynuclear methylol-substituted phenols are formed as intermediates in the case of the resoles. A resole produced by the condensation of phenol with formaldehyde most likely proceeds through an intermediate having the following illustrated type of structure:

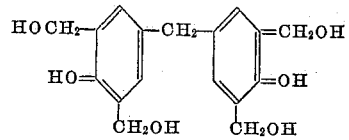

In a typical synthesis, resoles are prepared by heating one mole of phenol with 1.5 moles of formaldehyde under alkaline conditions. Then water and other volatiles are removed and condensation is completed at elevated temperatures under pressure.

The polyethers used in accordance with the invention can be prepared by reacting the benzene compounds above noted with a 1,2-alkylene oxide selected from the group of ethylene oxide, propylene oxide, butylene oxide and mixtures thereof. The reaction is conducted in the presence of a catalyst, e.g., alkali metal catalysts such as sodium hydroxide and potassium t-butoxide, by adding the alkylene oxide to the starting material which is preferably stirred and in a molten state or slurried in an inert solvent. The reaction is carried out in the absence of water under atmospheric or superatmospheric pressure at temperatures of about 110 to 170° C. The amount of catalyst employed generally ranges from about 0.002 to 2.0% by weight based on the total amount of reactants, including the alkylene oxide or mixtures thereof appearing in the reaction product. To the extent required any conventional heat transfer means can be used to remove the exothermic heat of reaction. The products of the reaction are generally mixtures which can be used as such or further refined to provide a purified product.

The average molecular weight and reactivity of the alkylene oxide addition products can be determined readily by analysis for hydroxyl content. The hydroxyl number is a measure of and is proportional to the hydroxyl concentration per unit weight. The hydroxyl number is defined in terms of milligrams of KOH equivalent per gram of alkylene oxide reaction product and is determined by reacting acetic anhydride (in pyridine solution) at refluxing temperature with the hydroxyl groups of the reaction product. The unreacted anhydride and acetic acid formed are titrated with aqueous sodium hydroxide using phenolphthalein as an indicator. The molecular weight can be readily calculated from the hydroxyl number by the formula:

$$M.W. = \frac{\text{Functionality} \times 1000 \times 56.1}{\text{Hydroxyl No.}}$$

The molecular weight of the polyethers used in preparing the flame-resistant polyurethane foams should range from about 200 to about 7500 to obtain foams of rigid and semi-rigid characteristics. Based on hydroxyl numbers the preferred polyethers are those which have hydroxyl numbers ranging from 56 to 540 as defined herein.

A variety of isocyanates may be employed for reaction with the polyethers above described to provide urethane foams which can be rendered flame-resistant according to the invention. Preferred isocyanates are polyisocyanates and polyisothiocyanates of the general formula:

$$R(NCG)_x$$

wherein G is oxygen or sulfur, $x$ is an integer of two or more and R is an alkylene, substituted alkylene, arylene or substituted arylene radical, a hydrocarbon, or substituted hydrocarbon containing one or more aryl —NCG bonds and one or more alkyl —NCG bond. R can also include radicals such as —RZR— where Z may be a divalent moiety such as —O—, —O—R—O—, —CO—, —CO₂—, —S—, —S—R—S—, —SO₂, etc.

Examples of such compounds include hexamethylene diisocyanate, 1,8-diisocyanato-p-menthane, xylylene diisocyanates, (OCNCH$_2$CH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, xylene-α,α'-diisothiocyanate, and isopropylbenzene-α,4-diisocyanate.

Further included are dimers and trimers of isocyanates and diisocyanates and polymeric diisocyanates of the general formulae:

(RNCG)$_x$ and [R(NCG)$_x$]$_y$ in which $x$ and $y$ are two or more, as well as compounds of the general formula:

M(NCG)$_x$ in which $x$ is two or more and M is a polyfunctional atom or group. Examples of this type include ethylphosphonic diisocyanate, C$_2$H$_5$P(O)(NCO)$_2$; phenylphosphonic diisocyanate; C$_6$H$_5$P(O)(NCO)$_2$; and isocyanates derived from sulfonamides [R(SO$_2$NCO)$_x$].

The preparation of polyether-based urethane foams can be carried out by forming a prepolymer, i.e., prereacting the molar equivalents of the polyether and isocyanate in the absence of water and thereafter producing a foam by the addition of excess isocyanate, catalyst, water and surfactant; by the one-shoe method in which the polyether, blowing agent, and isocyanate reactants are simultaneously mixed together and allowed to react in the presence of a catalyst; or by the semiprepolymer technique wherein the polyether reactant is partially extended with excess isocyanate to provide a reaction product containing a high percentage of free isocyanate groups (20–35%) which is then foamed at a later stage by reaction with additional polyether, a blowing agent and catalyst.

The amount of isocyanate used in the preparation of rigid or semirigid foams when external blowing agents are employed can be such that there is approximately the theoretical amount required to form a urethane linkage, —NHCO—O, in the polymer resulting from reaction of the isocyanate with the active hydrogens of the polyether. However, when the foaming is performed by means of isocyanate and water to form carbon dioxide, the amount of isocyanate employed is generally within 1.2 to 3.0 equivalents, preferably 1.2 to 2.0 equivalents, per equivalent of polyether.

The reaction of excess diisocyanate with a polyether produces a polymer having terminal isocyanate groups. When it is desired to form a foam, the mixture of the isocyanate-modified polyether reacts through the isocyanate groups with a chain extending agent containing active hydrogen, e.g., water, in the presence of a tertiary amine or an organic tin catalyst. This involves several reactions that proceed simultaneously including the reaction between the isocyanate groups and water to form urylene links (—NHCONH—) and carbon dioxide, as well as the reaction of the urylene links so formed with unreacted isocyanate groups to form biuret cross links. Depending upon the desired density of the urethane foam and the amount of cross linking desired, the total —NCO equivalent to total active hydrogen equivalent should be such as to provide a ratio of 0.8 to 1.2 equivalents of —NCO per equivalent of active hydrogen and preferably a ratio of about 0.9 to 1.1 equivalents.

The foaming operation also can be effected by means of a blowing agent, such as a low boiling, high molecular weight gas, which vaporizes at or below the temperature of the foaming mass. In rigid foams intended for use in the field of insulation and structural reinforcement the incorporation of a gas lowers its heat conductivity. If a fluorocarbon gas such as trichloromonofluoromethane, is used in blowing rigid foams, a lower K-factor is obtained than in rigid foams of equal density blown with air or carbon dioxide. The reactions that occur during this type operation include formation of the urethane linkage as well as the formation of isocyanate dimers and trimers. In addition, another reaction than can occur is the formation of allophanate structures.

Preferred blowing agents are the fluorocarbons such as trichloromonofluoromethane; dichlorodifluoromethane, dichlorofluoromethane, 1,1-dichloro-1-fluoroethane; 1-chloro-1,1-difluoro, 2,2-dichloroethane; and 1,1,1-trifluoro, 2-chloro-2-fluoro, 3,3-difluoro, 4,4,4-trifluorobutane. The amount of blowing agent used will vary with density desired in the foamed product. In general it may be stated that for 100 grams of resin mix containing an average NCO/OH ratio of 1 to 1, about 0.005 to 0.3 mole of gas are used to provide densities ranging from 30 to 1 lbs. per cubic foot. If desired, water may be used in conjunction with the blowing agent.

Organic tin catalysts that are suitable for accelerating the polyether-isocyanate reaction are compounds having the general formula:

(a) R$_3$SnX or R$_4$Sn
(b) R$_2$SnX$_2$
(c) RSnX$_3$
(d) R$_2$SnY
(e) RSnOOR'
(f) R(SnOOR')$_2$
(g) 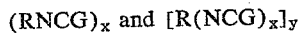
(h) R$_2$Sn(YRX)$_2$ in which R represents hydrocarbon or substituted hydrocarbon radicals such as alkyl, aralkyl, aryl, alkaryl, alkoxy, cycloalkyl, alkenyl, cycloalkenyl, and analogous substituted hydrocarbon radicals; the R' represents hydrocarbon or substituted hydrocarbon radicals such as those designated by the R or hydrogen or metal ions, the X represents hydrogen, halogen, hydroxyl, amino, alkoxy, substituted alkoxy, acyloxy, substituted acyloxy, acyl radicals or organic residues connected to tin through a sulfide link; and the Y represents chalcogens including oxygen and sulfur.

Among the compounds of group (a) that deserve special mention are trimethyltin hydroxide, tributyltin hydroxide, trimethyltin chloride, trimethyltin bromide, tributyltin chloride, trioctyltin chloride, triphenyltin chloride, tributyltin hydride, triphenyltin hydride, triallyltin chloride, tributyltin fluoride, tributyltin acetate, and tetrabutyltin, etc.

The compounds in group (b) that deserve particular mention and are representative of the group include dimethyltin diacetate, diethyltin diacetate, dibutyltin diacetate, dioctyltin diacetate, dilauryltin diacetate, dibutyltin dilaurate, dibutyltin maleate, dimethyltin dichloride, dibutyltin dichloride, dioctyltin dichloride, diphenyltin dichloride, diallyltin dibromide, diallyltin diiodide, bis-(carboethoxymethyl)-tin diiodide, dibutyltin dimethoxide, dibutyltin dibutoxide,

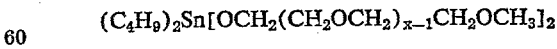

(in which $x$ is a positive integer), dibutyl-bis[O-acetylacetonyl]-tin, dibutyltin-bis(thiododecoxide), and

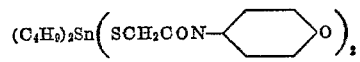

all readily prepared by hydrolysis of the corresponding dihalides. Many commercially available compounds used as stabilizers for vinyl resins are also included in this group.

Among the compounds that are representative of group (c) are butyltin trichloride, octyltin trichloride, butyltin triacetate and octyltin tris(thiobutoxide).

Typical among the compounds of group (d) are dimethyltin oxide, diethyltin oxide, dibutyltin oxide, dioctyltin oxide, dilauryltin oxide, diallyltin oxide, diphenyltin oxide, dibutyltin sulfide, [HOOC(CH$_2$)$_5$]$_2$SnO,

[CH$_3$OCH$_2$(CH$_2$OCH$_2$)$_{x-1}$CH$_2$]$_2$SnO and

[CH$_3$OCH$_2$(CH$_2$OCH$_2$)$_{x-1}$CHO(CH$_2$)$_5$]$_2$SnO (in which the $x$'s are positive integers).

Methylstannonic acid, ethylstannonic acid, butylstannonic acid, octylstannonic acid, HOOC(CH$_2$)$_5$-SnOOH, (CH$_3$)$_3$N(CH$_2$)$_5$SnOOH CH$_3$OCH$_2$(CH$_2$OCH$_2$)$_{x-1}$CH$_3$SnOOH and CH$_3$OCH$_2$(OH$_2$OCH$_2$)$_{x-1}$CH$_2$O-(CH$_2$)$_5$SnOOH are examples of group (e) catalysts and group (f) catalysts are represented by HOOSn(CH$_2$)$_x$SnOOH and HOOSnCH$_2$-(CH$_2$OCH$_2$)$_x$CH$_2$SnOOH, the $x$'s being positive integers.

Typical compounds in group (g) include compounds as poly(dialkyltin oxides) such as dibutyltin basic laurate and dibutyltin basic hexoxide.

Other compounds that are efficient catalysts are those of group (h), of which the organo-tin compounds used as heat and light stabilizers for chlorinated polymers and available under the trade names Advastab 17–M [1] and Advastab T–50–LT [2], are typical, as well as many other organo-tin compounds commercially available.

Other organic tin compounds which can be used include the divalent tin compounds selected from the group consisting of stannous acylates and stannous alkoxides.

Suitable stannous acylates are the divalent tin salts of aliphatic mono- and polycarboxylic acids which contain from 1 to 54 carbon atoms. The acids can be saturated, such as acetic acid, 2-ethylhexanoic acid, etc.; unsaturated such as oleic acid, linoleic acid, ricinoleic acid, and the like; or they may be polymerized fatty acids derived from natural oils, e.g., linseed oil, tung oil, soybean oil, dehydrated castor oil, which have a molecular weight up to about 500. Examples of specific acylates include: stannous acetate, stannous propionate, stannous oxalate, stannous tartrate, stannous butyrate, stannous valerate, stannous caproate, stannous caprylate, stannous octoate, stannous laurate, stannous palmitate, stannous stearate, and stannous oleate. Of these materials the preferred catalysts are stannous acetate, stannous octoate and stannous oleate.

The stannous alkoxides which can be used may be represented by the formula:

Sn(OR)$_2$ in which R is a monovalent hydrocarbon radical, saturated or unsaturated, branched chain or straight chain, containing 1 to 18 carbon atoms, preferably 3 to 12. Representative examples of stannous alkoxides include stannous methoxide, stannous isopropoxide, stannous butoxide, stannous t-butoxide, stannous 2-ethylhexoxide, stannous tridecanoxide, stannous heptadecanoxide, stannous phenoxide, and o-, m- and p-stannous cresoxides, etc.

Other catalysts which can be employed in combination with the tin catalysts above noted are amine catalysts such as 2,2,1-diazabicyclooctane, trimethylamine, 1,2-dimethylimidazole, triethylamine, diethylcyclohexylamine, dimethyl long-chain C$_{12}$ to C$_{18}$ amines, dimethylaminoethanol, diethylaminoethanol, N-methylmorpholine, N-ethylmorpholine, triethanolamine and N,N,N',N'-tetramethyl-1,3-butanediamine.

The following examples illustrate the best mode now contemplated for carrying out the invention.

EXAMPLE 1

130 grams of a polyether blend prepared by the addition of propylene oxide to 1,1,3-tris(hydroxyphenyl)propane (hydroxyl No. 268) and 96 grams of a semiprepolymer prepared therefrom by reaction with tolylene diisocyanate (29.1% total free NCO) were mixed with 1.0 gram dibutyltin dilaurate, 1.0 gram of a silicone oil surfactant (siloxane-oxyalkylene copolymer) and 39–41 grams of trichloromonofluoromethane. As soon as the mixture began to foam it was discharged into an open mold and cured for 10 minutes at 70° C. The foamed product has a density between 1.9 and 2.1 lbs./cu. ft.

EXAMPLE 2

100 grams of a propylene oxide addition product of glycerol (hydroxyl No. 640) and 175 grams of a semiprepolymer prepared therefrom by reaction with tolylene diisocyanate (29.9% total free NCO) were mixed with 1.2 grams of a silicone oil surfactant (siloxane-oxyalkylene copolymer), 0.8 gram dibutyltin dilaurate and 38–43 grams trichloromonofluoromethane. The foamed product was cured for 10 minutes at 70° C. and has a density between 1.8 and 2.0 lbs./cu. ft.

EXAMPLE 3

180 grams of a polyether blend prepared by the addition of propylene oxide to a phenol-formaldehyde resin containing an average of four to five phenolic rings per molecule [3] (hydroxyl No. 247) and 122.5 grams of a semiprepolymer prepared therefrom by reaction with tolylene diisocyanate (28.8% total free NCO) were mixed with 1.2 grams of a silicone oil surfactant (siloxane-oxyalkylene copolymer), 0.5 gram dibutyltin dilaurate and 46–48 grams trichloromonofluoromethane. The foamed product, after curing for 10 minutes at 70° C., has a density between 1.8 and 2.4 lbs./cu. ft.

EXAMPLE 4

80 grams of the polyether blend as prepared in Example 1 (hydroxyl No. 268) and 80 grams of a polyether blend prepared by the addition of propylene oxide to 4,4'-diaminodiphenylmethane (hydroxyl No. 230) were mixed with 66 grams of tolylene diisocyanate, 1.2 grams of a silicone oil surfactant (siloxane-oxyalkylene copolymer), 0.4 gram dibutyltin dilaurate, 0.4 gram N,N,N',N'-tetramethyl-1,3-butanediamine and 35–38 grams of trichloromonofluoromethane. The foamed product was cured at 70° C. for 10 minutes and has a density between 2.0 and 2.8 lbs./cu. ft.

The polyurethane foams prepared in Examples 1 to 4 were blended prior to foaming with varying amounts of antimony trioxide and vinyl halide resin and tested for flammability characteristics according to the ASTM D–1692–59T test procedure previously described. If the foam burns (ASTM Class B) the rate of burning is reported in inches per minutes (i.p.m.). If the foam is self-extinguishing (ASTM Class S) or non-burning (ASTM Class N) the extent of burning is reported in inches. In instances where ignition of ten specimens results in nine specimens classified as non-burning (N) and one specimen self-extinguishing (S), the flammability of the sample has been judged inconclusive (I). The data tabulated in Table I below illustrates that polyurethane foams prepared from polyether derivatives of benzene compounds can be rendered flame-resistant (ASTM Class N) at lower additive levels than comparable polyurethane foams derived from aliphatic-based polyethers. The percentages shown are weight percentages based on the polyether-isocyanate reaction mixture.

---

[1] Alkyltin mercaptide, about 90–92% pure, partial structure, (C$_4$H$_9$)$_2$Sn(–OC$_8$H$_{17}$, C$_x$H$_y$O$_z$S); percent C=55.1, percent H= 9.1 percent S=8.5, percent Sn=15.6; probable structure: (C$_4$H$_9$)$_2$Sn(SCH$_2$CO$_2$C$_8$H$_{17}$)$_2$.
[2] Pure liquid (no additives), polymeric, partial structure, (C$_4$H$_9$)$_2$Sn(C$_x$H$_y$O); percent C=45.9, percent H=6.5, percent Sn=20.2.

[3] Prepared from a reaction mixture of phenol (100 parts), formalin (56.5 parts) and lead acetate (.75 part) heated at about 100° C. for two hours, then after partial dehydration distillation, heated at 150° C. to 158° C. for one hour.

Table I

| Example | Percent Polyols Used in— | | | | Percent TDI[1] | Percent Vinyl Halide[2] | Percent Sb$_2$O$_3$ | Density, p.c.f. | Appearance[3] | ASTM Class | Rate or Extent | Ig/B[4] |
|---|---|---|---|---|---|---|---|---|---|---|---|---|
| | Ex. 1 | Ex. 2 | Ex. 3 | Ex. 4 | | | | | | | | |
| 5 | 55.4 | | | | 24.3 | 4 | 1 | 1.9 | AAA | S | 2.3 in | 23/83 |
| 6 | 54.9 | | | | 24.1 | 4 | 2 | 2.1 | AAA | S | 2.3 in | 23/96 |
| 7 | 54.3 | | | | 23.8 | 4 | 3 | 2.1 | ABB | I | 2.6 in | 37/154 |
| 8 | 54.9 | | | | 24.1 | 5 | 1 | 2.1 | ABB | N | 0.7 in | |
| 9 | 54.3 | | | | 23.8 | 5 | 2 | 2.1 | ABB | N | 0.7 in | |
| 10 | 53.8 | | | | 23.6 | 5 | 3 | 2.1 | ABB | N | 0.7 in | |
| 11 | 54.3 | | | | 23.8 | 6 | 1 | 2.1 | ABB | I | 4.1 in | 8/144 |
| 12 | 53.8 | | | | 23.6 | 6 | 2 | 2.0 | ABB | N | 0.8 in | |
| 13 | 53.2 | | | | 23.3 | 6 | 3 | 2.1 | ABB | S | 3.1 in | 24/130 |
| 14 | 58.8 | | | | 25.8 | 0 | 0 | 2.0 | AAA | S | 2.4 in | 19/58 |
| 15 | | 37.3 | | | 40.5 | 6 | 4 | 2.0 | AAA | I | 3.5 in | 22/95 |
| 16 | | 36.9 | | | 40.1 | 6 | 5 | 2.0 | AAA | N | 0.9 in | |
| 17 | | 36.4 | | | 39.5 | 6 | 6 | 2.0 | AAA | N | 1.0 in | |
| 18 | | 36.9 | | | 40.1 | 7 | 4 | 2.0 | AAA | N | 1.0 in | |
| 19 | | 36.4 | | | 39.5 | 7 | 5 | 1.9 | ABA | N | 1.0 in | |
| 20 | | 36.0 | | | 39.1 | 7 | 6 | 2.0 | ABA | N | 0.9 in | |
| 21 | | 36.4 | | | 39.5 | 8 | 4 | 2.0 | ABA | N | 0.9 in | |
| 22 | | 36.0 | | | 39.1 | 8 | 5 | 2.0 | ABA | N | 1.0 in | |
| 23 | | 35.4 | | | 38.5 | 8 | 6 | 2.0 | ABA | N | 0.9 in | |
| 24 | | 41.9 | | | 45.5 | 0 | 0 | 1.8 | ABA | B | 8.3 i.p.m | 14/92 |
| 25 | | | 59.2 | | 23.9 | 3 | 1 | 2.2 | AAB | B | 6.2 i.p.m | 18/148 |
| 26 | | | 58.4 | | 23.6 | 3 | 2 | 2.1 | ABB | N | 0.7 in | |
| 27 | | | 57.7 | | 23.3 | 3 | 3 | 2.2 | AAB | N | 0.9 in | |
| 28 | | | 58.4 | | 23.6 | 4 | 1 | 2.2 | AAB | N | 0.8 in | |
| 29 | | | 57.7 | | 23.3 | 4 | 2 | 2.3 | ABC | N | 0.8 in | |
| 30 | | | 57.1 | | 23.1 | 4 | 3 | 2.1 | ABB | N | 0.8 in | |
| 31 | | | 57.7 | | 23.7 | 2 | 4 | 2.3 | ABB | N | 0.9 in | |
| 32 | | | 57.1 | | 23.1 | 3 | 4 | 2.4 | ABC | N | 0.9 in | |
| 33 | | | 56.3 | | 22.8 | 4 | 4 | 2.2 | ABC | N | 0.9 in | |
| 34 | | | 61.5 | | 24.9 | 0 | 0 | 1.8 | ABC | B | 4.1 i.p.m | 21/139 |
| 35 | 28.4 | | | 28.4 | 23.4 | 4 | 2 | 2.0 | ABA | S | 3.3 in | 14/114 |
| 36 | 27.7 | | | 27.7 | 22.8 | 4 | 4 | 2.4 | ABB | S | 2.2 in | 15/7? |
| 37 | 27.4 | | | 27.4 | 22.6 | 5 | 4 | 2.6 | ABB | S | 4.4 in | 21/179 |
| 38 | 27.7 | | | 27.7 | 22.8 | 6 | 2 | 2.5 | ABB | S | 3.5 in | 18/154 |
| 39 | 27.1 | | | 27.1 | 22.3 | 6 | 4 | 2.5 | AAA | I | 3.0 in | 15/90 |
| 40 | 30.4 | | | 30.4 | 25.1 | 0 | 0 | 2.3 | AAA | S | 3.5 in | 16/78 |
| 41 | 52.2 | | | | 22.4 | ³6 | 4 | 1.8 | AAA | S | 1.7 in | 14/58 |
| 42 | 49.4 | | | | 21.4 | ³8 | 6 | 1.9 | AAA | S | 2.1 in | 14/65 |

[1] Mixture of 80% 2,4- and 20% 2,6-tolylene diisocyanate.
[2] Poly(vinyl chloride) having reduced viscosity of 1.42 used in Examples 5–40.
[3] Copolymer of vinyl chloride and vinyl acetate having a reduced viscosity of 0.57 and containing 5.3 wt. percent vinyl alcohol, 4.4 wt. percent vinyl acetate and 90.4 wt. percent vinyl chloride.
[4] Ignition time in seconds/extinguishment time in seconds.
[5] The appearance of the foam is rated by a three-letter code with the first letter estimating average cell size, the second letter uniformity of cell size and the third letter bulk flaws (splits, ridges, burns, etc.) wherein—

| 1st Letter | 2d Letter | 3d Letter |
|---|---|---|
| A = Fine. | Good. | None. |
| B = Medium. | Fair. | Minor. |
| C = Large. | Poor. | Severe. |

The polyurethane foams tested for flammability characteristics in Table I were also tested for compressive strengths in a direction perpendicular ($\perp$) and parallel ($\parallel$) to the foam rise at 23° C. The loss in tensile strength accompanying sufficient vinyl halide resin and antimony trioxide to obtain a non-burning foam (ASTM Class N) having a density of 2 lbs./cu. ft. is reported in Table II.

As shown below the achievement of flame resistance at low additive levels in polyurethane foams prepared from polyether derivatives of benzene compounds results in a smaller and less appreciable loss of desired physical properties, e.g., tensile strength, than in comparable foams derived from aliphatic-based polyethers (Examples 16 and 18).

Table II

| Example | Orientation | Tensile Strength, p.s.i. | | | Percent Strength Lost in Achieving ASTM Class N | Conc. of Additives, Wt. percent | |
|---|---|---|---|---|---|---|---|
| | | Base Foam | Fire-Resistant | = Lost | | Vinyl Halide | Sb$_2$O$_3$ |
| 8 | $\parallel$ | 42.0 | 27.0 | 15.0 | 36 > 32 | 5.0 | 1.0 |
| | $\perp$ | 29.0 | 20.9 | 8.1 | 28 | | |
| 28 | $\parallel$ | 34.4 | 27.2 | 7.2 | 21 > 26 | 4.0 | 1.0 |
| | $\perp$ | 33.9 | 23.0 | 10.9 | 32 | | |
| 16 | $\parallel$ | 54.5 | 28.0 | 26.5 | 49 > 52 | 6.0 | 5.0 |
| | $\perp$ | 33.3 | 15.4 | 17.9 | 54 | | |
| 18 | $\parallel$ | 54.5 | 29.8 | 24.7 | 45 > 48 | 7.0 | 4.0 |
| | $\perp$ | 33.3 | 16.2 | 17.1 | 51 | | |
| 39 | $\parallel$ | 27.5 | 18.3 | 9.2 | 33 > 40 | 6.0 | 4.0 |
| | $\perp$ | 30.5 | 16.0 | 14.5 | 48 | | |

What is claimed is:

1. A process for the preparation of flame-resistant polyurethane foams which comprises catalytically reacting a polyether having active hydrogens and a molecular weight of at least 200 which is an alkylene oxide addition product of a polyhydroxybenzene compound with an organic polyisocyanate in the presence of a blowing agent, 0.5 to 5.0% by weight antimony trioxide and 1.0 to 10% by weight of a vinyl chloride resin having a reduced viscosity ranging from 0.1 to 10.0.

2. The process of claim 1 wherein the polyether is an alkylene oxide addition product of a polynuclear hydroxybenzene.

3. The process of claim 1 wherein the polyether is an alkylene oxide addition product of a novolak phenolic resin.

4. The product produced according to the method of claim 1.

5. A process for the preparation of flame-resistant polyurethane foams which comprises catalytically reacting a polyether having at least two active hydrogens and a molecular weight ranging from 200 to about 7500 which is an alkylene oxide addition product of a polyhydroxybenzene compound with an organic diisocyanate in the presence of a blowing agent, 0.5 to 5.0% by weight antimony trioxide and 1.0 to 10% by weight of a vinyl chloride resin having a reduced viscosity ranging from 0.1 to 10.0.

6. The process of claim 5 wherein the vinyl chloride resin is a member selected from the group consisting of poly(vinyl chloride) and copolymers of vinyl chloride with vinyl acetate.

7. The process of claim 6 wherein the polyether is an alkylene oxide addition product of a 1,1,3-tris(hydroxyphenyl) alkane.

8. The process of claim 7 wherein the alkane is 1,1,3-tris(hydroxyphenyl) propane.

9. The product produced according to the process of claim 6.

References Cited in the file of this patent

UNITED STATES PATENTS

| | | |
|---|---|---|
| 2,634,244 | Simon et al. | Apr. 7, 1953 |
| 2,843,568 | Benning et al. | July 15, 1958 |
| 2,888,408 | Rogers et al. | May 26, 1959 |